ас
US 9,225,221 B2

(12) United States Patent
Mikkelsen et al.

(10) Patent No.: US 9,225,221 B2
(45) Date of Patent: Dec. 29, 2015

(54) STATOR HOUSING ASSEMBLY FOR A CANNED MOTOR

(75) Inventors: Steen Mikkelsen, Bjerringbro (DK); Brian Lundsted Poulsen, Langaa (DK)

(73) Assignee: Grundfos Management a/s, Bjerringbro (DK)

(*) Notice: Subject to any disclaimer, the term of this patent is extended or adjusted under 35 U.S.C. 154(b) by 434 days.

(21) Appl. No.: 12/936,848

(22) PCT Filed: Feb. 28, 2009

(86) PCT No.: PCT/EP2009/001442
§ 371 (c)(1),
(2), (4) Date: Oct. 7, 2010

(87) PCT Pub. No.: WO2009/143918
PCT Pub. Date: Dec. 3, 2009

(65) Prior Publication Data
US 2011/0033321 A1    Feb. 10, 2011

(30) Foreign Application Priority Data
Apr. 19, 2008   (EP) .................................... 08007691

(51) Int. Cl.
*F04D 13/06*   (2006.01)
*H02K 5/128*   (2006.01)
*H02K 5/15*    (2006.01)
*H02K 7/14*    (2006.01)

(52) U.S. Cl.
CPC .............. *H02K 5/1285* (2013.01); *F04D 13/06* (2013.01); *H02K 5/15* (2013.01); *H02K 7/14* (2013.01)

(58) Field of Classification Search
CPC ............ F04D 13/0606; F04D 13/0626; H02K 5/1285; H02K 5/14; H02K 5/15

USPC ................... 417/423.11, 423.14, 423.12
See application file for complete search history.

(56) References Cited

U.S. PATENT DOCUMENTS

| 2,942,555 A | * | 6/1960 | Pezzillo | 417/372 |
| 3,837,767 A | * | 9/1974 | Aller | 417/423.14 |
| 3,999,890 A | * | 12/1976 | Niedermeyer | 417/17 |
| 5,034,644 A | | 7/1991 | Kech | |
| 5,049,770 A | * | 9/1991 | Gaeth et al. | 310/89 |
| 5,525,039 A | * | 6/1996 | Sieghartner | 417/32 |
| 6,365,998 B1 | | 4/2002 | Kech et al. | |
| 2002/0041814 A1 | * | 4/2002 | Casper et al. | 417/423.14 |
| 2003/0160527 A1 | | 8/2003 | Kimberlin et al. | |
| 2004/0234389 A1 | * | 11/2004 | Hatano et al. | 417/370 |
| 2008/0219839 A1 | | 9/2008 | Pfetzer et al. | |

FOREIGN PATENT DOCUMENTS

| DE | 44 38 132 A1 | 5/1996 |
| DE | 19912614 A1 | 9/2000 |

(Continued)

OTHER PUBLICATIONS

Int'l Search Report issued on Feb. 15, 2010 in Int'l Application No. PCT/EP2009/001442.

*Primary Examiner* — Charles Freay
*Assistant Examiner* — Philip Stimpert
(74) *Attorney, Agent, or Firm* — Panitch Schwarze Belisario & Nadel LLP

(57) ABSTRACT

A stator housing assembly (3) for a pump (2) having a wet-running electric motor (8) includes a stator housing (4) and a can (6), wherein the stator housing (4) and the can (6) are designed as a single component (3). The stator housing assembly (3) also includes at least one engagement element (310) for positively connecting to a pump housing (14).

13 Claims, 6 Drawing Sheets

(56) References Cited

FOREIGN PATENT DOCUMENTS

| | | |
|---|---|---|
| DE | 19921365 A1 | 11/2000 |
| DE | 10103209 A1 | 7/2002 |
| DE | 102005057661 A1 | 6/2007 |
| EP | 0357913 A2 | 3/1990 |
| EP | 0 374 612 A1 | 6/1990 |
| EP | 0963029 A2 | 12/1999 |
| FR | 2 533 976 A1 | 4/1984 |
| JP | 59103990 A * 6/1984 | ............ F04D 13/06 |
| WO | 2007023014 A1 | 3/2007 |

* cited by examiner

STATOR HOUSING ASSEMBLY FOR A CANNED MOTOR

CROSS-REFERENCE TO RELATED APPLICATIONS

This application is a Section 371 of International Application No. PCT/EP2009/001442, filed Feb. 28, 2009, which was published in the German language on Dec. 3, 2009, under International Publication No. WO 2009/143918 A3, and the disclosure of which is incorporated herein by reference.

BACKGROUND OF THE INVENTION

The present invention relates generally to a stator housing assembly for a canned motor, as well as in particular to a pump with a stator housing assembly.

Pumps with a canned motor, according to the state of the art, comprise a pump housing, in which an impeller drives a fluid from the inlet region and into the outlet region. The impeller is driven by a rotor which is mounted in a can in a wet-running manner. This closes off the rotor space in a fluid-tight manner with respect to a surrounding stator housing, in which a stator is accommodated for rotating the rotor. Accordingly, pumps with a canned motor comprise a multitude of individual parts which are to be assembled in a costly and time-consuming manner.

BRIEF SUMMARY OF THE INVENTION

It is an object of the present invention to reduce the time effort and cost effort for the assembly and manufacture of a canned motor.

The above object is achieved by a stator housing assembly with the features specified in the independent claim(s), as well as by a pump with the features specified in the dependent claim(s). Preferred embodiments are to be deduced from the associated dependent claims, the subsequent description and the drawings.

The stator housing assembly according to the present invention, for a pump with a wet-running electric motor, includes a stator housing and a can, and is designed as a single-part component. Thereby, the stator housing and the can are formed together as a single-part or single-piece component, preferably of an identical material. In this case, already on manufacture of the pump components, one may make do without a series of production steps, as occur with an individual manufacture of stator housing and can, by which means production costs and production time may be saved. Preferably, the stator housing and the can are connected to one another at an end-side via a wall, which is designed as an annulus orientated perpendicularly to the rotation axis and surrounding this peripherally. Advantageously, the can may be simply designed in a fluid-tight manner by way of common, single-part manufacture with the stator housing and the end-wall connecting both.

Simultaneously, such a single-piece or single-part component, which contains the stator housing and can, permits significant simplifications on assembly. Thus pump components present individually as a stator housing or can are assembled in each case in a single assembly step which is time-consuming and costly. Compared to this, a single-part component of can and stator housing also requires less effort to assemble, since the number of pump components to be assembled is reduced accordingly by at least one. Moreover, the manufacture of the single-part component in several steps, is possible.

Preferably, the stator housing and the can are manufactured of plastic, preferably as an injection moulded part. In particular, one may manufacture particularly complex shapes, as are present with a single-part component of stator housing and can, in a relatively effortless and inexpensive manner by way of injection molding. The use of plastic moreover provides the advantage of being able to carry out a coloring of the single-part component already on its manufacture. This is particularly relevant to a stator housing, whose coloring is to remain visible from the outside even with an assembled pump. In this case, one may make do without a subsequent painting. A suitably coloured plastic is used for this.

Further preferably, the stator housing and the can are manufactured of a composite material, in particular containing polyphenylene sulphide (PPS). For example, the composite material may be designed as a fibre-reinforced plastic. PPS thereby is particularly suitable for pumps with a canned motor, since it is the case of a plastic which is chemically extremely resilient. Moreover, PPS is high-temperature resistant. Further preferably, at least the can is coated with metal, in particular vapour-deposited. In this manner, the can may be designed in a sealed manner, in particular in a diffusion-tight manner. Thus, a pump designed in such a manner may also be applied as a submersible pump.

Further preferably, a cavity is formed between the stator housing and the can, in which cavity struts are arranged between the stator housing and the can. The, struts amongst other things, may be designed as beam-like or flat structures. Preferably, the struts are designed as essentially radially extending ribs, which connect the can and the stator housing to one another. Usefully, the struts are designed such that the cavity formed between the can and the stator housing remains useful for receiving the stator. These struts accommodate forces between the stator housing and the can, and may contribute to the connection of the stator housing and the can as a single-piece component. In particular, the struts themselves may be designed as one piece with the remaining stator housing assembly.

In particular, by way of the struts, one prevents the single-part component of stator housing and can from being deformed or breaking, given forces which act on the can and/or the stator housing. For example, forces act on the can as a result of the pressure of the fluid to be pumped, which bears on the inner surface of the can. Moreover, such forces may originate from a rotor bearing arranged in the can. The cavity formed between the stator housing and the can, as is known per se, permits the arrangement of the stator between the can and the stator housing. For this, the single-part unit of the stator housing and the can, as a result, is adequately stable due to the struts, as well as designed with sufficiently large construction space for the stator.

Further preferably, with regard to the stator housing assembly, the can at one axial end has an end-face, in which a through-hole with an inner thread and extending preferably coaxially with the longitudinal axis of the can, is formed. The rotor may be rotated when required via this through-hole. The through-hole is closed during normal operation of the pump. The closure may be effected with a screw which fits with the inner thread of the through-hole and which closes the can, as is known per se. Usefully, with a single-piece component manufactured by way of injection molding, the inner thread is formed by way of inserting a threaded arbor into the casting mold. The threaded arbor thereby may be screwed out of the injection molded part after the injection molding, and thus releases the thread.

Advantageously, with regard to a stator housing assembly, the stator housing comprises at least one engagement element for the positive-fit connection to a pump housing. Thereby, the stator housing assembly does not necessarily contain a single-part construction unit of stator housing and can, as has been described previously. A time-consuming screwing of the stator housing to the pump housing is avoided with such a positive-fit connection. The positive fit connection of the stator housing to a pump housing via the engagement element or elements of the stator housing, may in contrast be designed in a single process step. Such a designed stator housing assembly thus advantageously contributes to saving assembly costs and assembly time. The at least one engagement element of the stator housing is thereby preferably designed in a manner such that the positive-fit connection to the pump housing is releasable. With this, such a pump may also be opened again in an uncomplicated manner, by which means time and costs for inspection, maintenance or repair, may be saved.

The pump according to the present invention, with a wet-running electric motor, comprises a stator housing assembly with the features described above. Such a pump, as already described above in the context of the advantages of the stator housing assembly, may be manufactured and assembled with significantly reduced effort, reduced production costs and shorter assembly times.

Preferably, the pump comprises a pump housing, wherein the pump housing as well as the stator housing are provided with engagement elements corresponding to one another, which are engaged with one another with a positive fit, and thus connect the pump housing to the stator housing. Such a positive-fit connection of the pump housing and stator housing requires no additional screwing. For this reason, the connection may be carried out with a low cost expense and low assembly effort. Preferably, the pump housing and stator housing comprise engagement elements which are designed in such a manner, correspond to one another and connect the pump housing and stator housing to one another with a positive fit and in a simultaneously releasable manner. The maintenance or the repair of such a pump may be carried out in this manner with a significantly reduced effort and correspondingly reduced costs.

Further preferably, with regard to the pump, the stator housing has an axial end which faces the pump housing and with an essentially cylinder-envelope-shaped outer peripheral surface, and the pump housing has an end which faces the pump housing and with an essentially cylindrical inner peripheral surface, wherein the engagement elements are orientated in the radial direction on these outer and inner peripheral surfaces. Usefully, the engagement elements are arranged within the pump housing. In this manner, the outer peripheral surface of the pump housing may be designed in an essentially cylindrical and non-profiled manner along this connection.

Thus, radially projecting projections may be formed on the outer peripheral surface of the stator housing, which engage in recesses on the inner peripheral surface of the pump housing, or vice versa. Thereby, the projections preferably engage behind a bearing shoulder, which prevents a movement in the axial direction and holds the pump housing and stator housing together in this direction.

Preferably, the engagement elements form a connection in the form of a bayonet closure. Thereby, the bayonet closure preferably comprises a clamping element, spring element and/or locking element, by way of which the pump housing and the stator housing are locked and/or fixed, impinged by force, in the position of the closed connection. In this manner, one may create a safeguard against an unintended release of the pump housing and stator housing. Preferably, the radially orientated engagement elements on their side close to the stator housing, comprise a surface piece which is inclined in the direction of the stator housing with an increasing radial distance to the respective cylindrical peripheral surface. Thus the engagement elements engage into one another in a hook-like manner. The engagement elements of the stator housing suitably essentially have the shape of a prism with a rectangular base surface, wherein the side of the prism, said side facing the stator housing, is inclined in the direction of the stator housing with an increasing radial distance to the cylindrical peripheral surface.

Preferably, with regard to the pump, a sealing ring is arranged between the stator housing and the pump housing, preferably peripherally around a sealing flange arranged on the stator housing. Preferably, this sealing flange forms a circular-cylindrical projection on the stator housing, which is arranged on that side of the stator housing, which is connected to the pump housing, and peripherally surrounds the rotor axis. The sealing ring thereby is arranged peripherally around the sealing flange, so that the pump housing comes to bear on the sealing ring over the whole periphery of this. In this manner, the inner space of the pump, which is formed by the pump housing and the can, and in which the rotor and impeller move, is sealed at the connection location of the pump housing and stator housing or can, so that no fluid may exit from the pump.

Preferably the pump is a heating circulation pump.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention is hereinafter described in more detail by way of one embodiment example represented in the drawing. There are shown in the drawings.

DETAILED DESCRIPTION OF THE INVENTION

Figure 1:
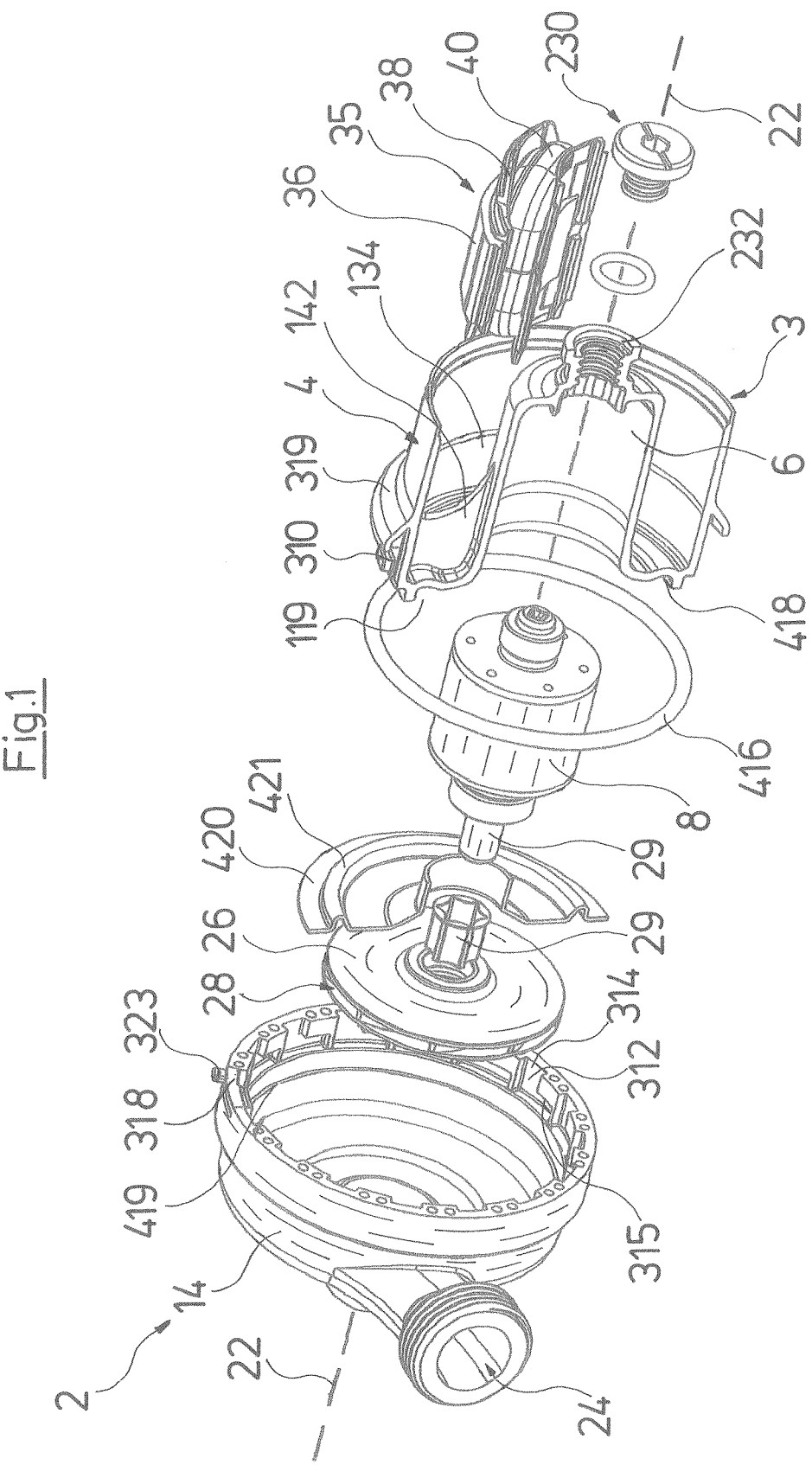
FIG. 1 is an exploded perspective view a heating circulation pump with a stator housing assembly in accordance with a preferred embodiment of the present invention.

Certain terminology is used in the following description for convenience only and is not limiting. The words "first" and "second" designate an order of operations in the drawings to which reference is made, but do not limit these steps to the exact order described. Additionally, the term "a," "an," and "the," as used in the specification, mean "at least one." The terminology includes the words above specifically mentioned, derivatives thereof, and words of similar import.

Figure 6:
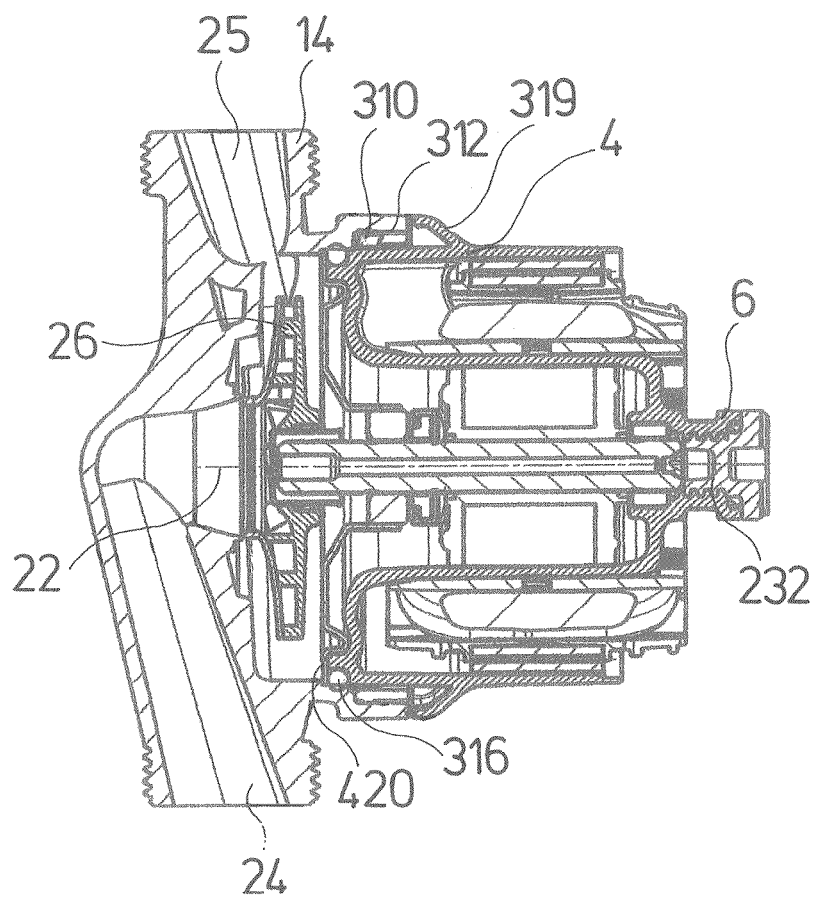
FIG. 6 is a partially cross-sectional schematic representation of the heating circulation pump shown in FIG. 1, with a positive-fit connection of stator housing and pump housing.
Figure 7:
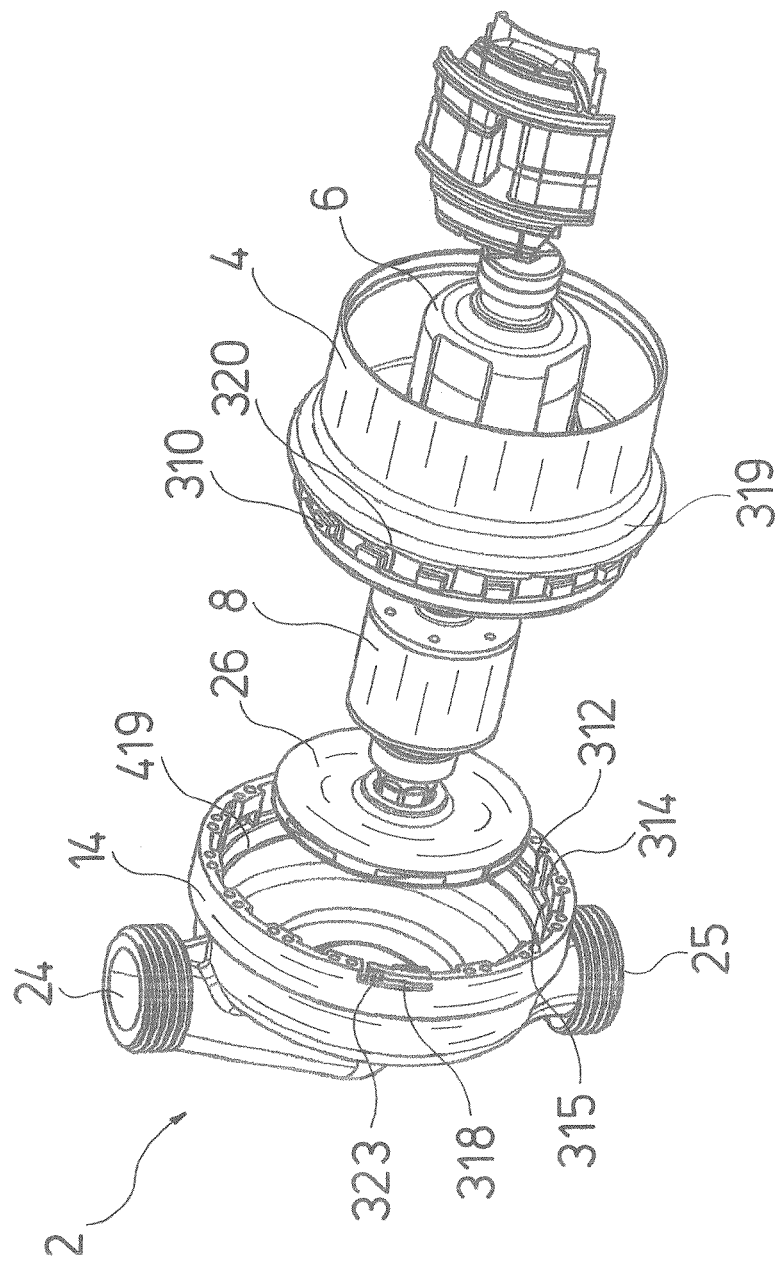
FIG. 7 is an exploded perspective view of the heating circulation pump shown in FIG. 1.

Referring to the drawings in detail, wherein like numerals indicate like elements throughout, there is shown FIGS. 1, 6 and 7 a heating circulation pump 2 in accordance with a preferred embodiment of the present invention. The heating circulation pump 2 preferably includes a stator housing assembly 3 with a stator housing 4 and with a can 6 which is designed as one part with this stator housing 4. A rotor 8 orientated coaxially to the can 6 is rotatably mounted in the interior of the can 6. A pump housing 14 is attached to the stator housing 4, at that side of the stator housing assembly 3, to which the can 6 is opened at its axial end. Thereby, the pump housing 14 is orientated coaxially to the rotor axis 22. The pump housing 14 at the suction side comprises a supply conduit 24 and at the pressure side a discharge conduit 25, for the water to be pumped. The water gets through the supply conduit 24 into a central inlet (not shown) of an impeller 26 which is set in rotation by the rotor 8. The impeller 26 for this is driven by the rotor 8 via connection elements 29. The rotor 8, for its part, is set into rotation by a stator 35 which consists of a stator core 36, winding carriers 38 and windings 40.

The stator housing assembly 3 with the stator housing 4 and the can 6 formed with the stator housing 4 as one part, is held together essentially by an end-face 119 of the stator housing assembly 3. The end-face 119 is close to the pump housing 14 and designed as one piece with the can 6 and the pump housing 14. The end-face 119 thereby essentially has the shape of an annulus, which is orientated perpendicularly to the rotor axis 22 and peripherally surrounds the rotor axis 22. Its outer periphery thereby borders the stator housing 4 or merges smoothly into this, while its inner periphery connects to the peripheral surface of the can 6 in a smooth manner. Thereby, the can 6 and the stator housing 4 delimit a cavity 134 which peripherally surrounds the can 6. The stator 35 for the drive of the rotor 8, is located in this cavity 134. So as to stabilize the stator housing assembly 3, given forces acting on the can 6 and/or the stator housing 4, the can 6 and the stator housing 4 are connected to one another via struts 142 which are designed as radially orientated ribs and which thus support the peripheral walls of the cavity 134 to one another. The single-piece stator housing assembly 3 is preferably manufactured by way of injection molding from a composite material with plastic polyphenylene sulphide (PPS), which is particularly suitable for application in heating circulation pumps due to its temperature-resistance. Moreover, the composite material contains fibres, which reinforce the plastic.

Figure 2:
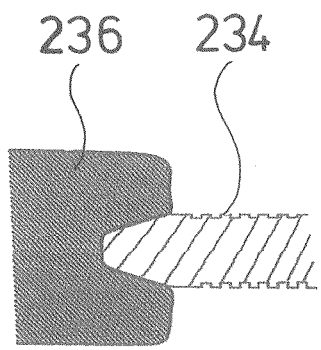
FIG. 2 is a partially cross-sectional schematic representation of a casting core with a threaded arbor for manufacturing the stator housing assembly of the heating circulation pump shown in FIG. 1.
Figure 3A:
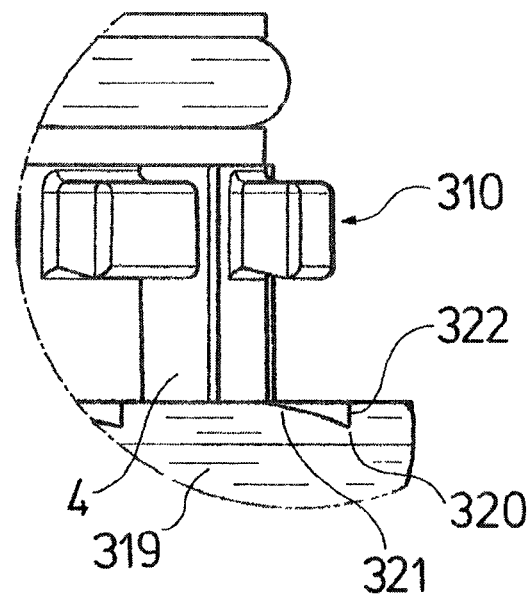
FIG. 3A is an enlarged elevation view of a portion of the stator housing assembly shown in FIG. 1, taken from within circle "A" of FIG. 3.
Figure 3:
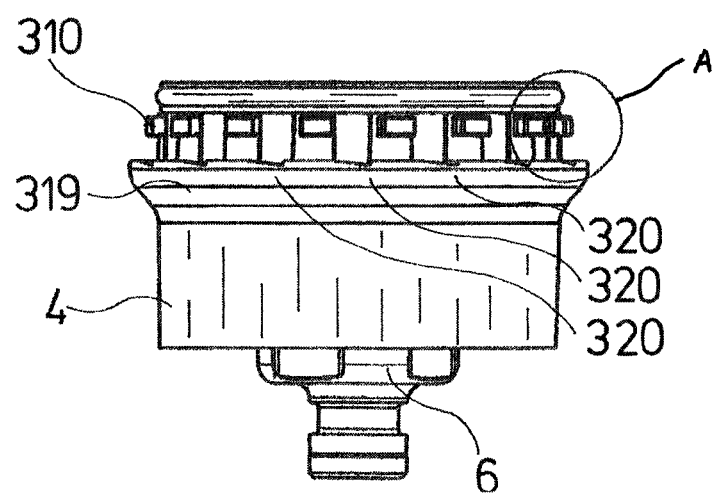
FIG. 3 is an elevation view of the stator housing assembly shown in FIG. 1.

The can 6, at an axial end which is distant to the pump housing 14, preferably includes an end-face, in which a screw 230 closes a through-hole 232 provided with an inner thread. The through-hole 232 thereby is orientated coaxially to the rotor axis 22. The through-hole 232 with the inner thread is formed directly in the injection molding process for manufacturing the single-piece construction unit of the stator housing 4 and the can 6 (FIG. 2). For this, a threaded arbor 234 is inserted into a casting core 236 for the can 6. After the solidification of the injection molded part 6, the threaded arbor 234 is screwed out of the can 6.

Figure 4:
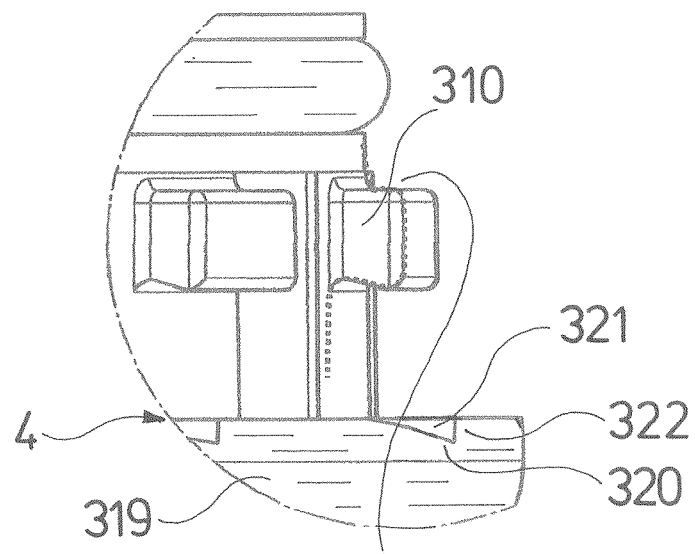
FIG. 4 is an enlarged elevation view of the stator housing assembly shown in FIG. 1, taken from within circle "A" of FIG. 3.
Figure 5:
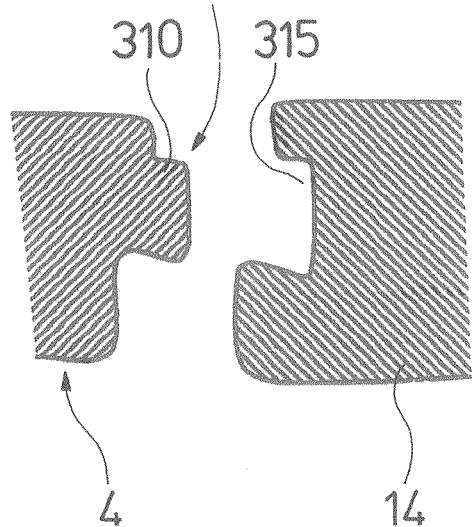
FIG. 5 is a cross-sectional schematic representation of a connection of the stator housing and the pump housing according to FIG. 1.

The stator housing 4, close to its axial end which faces the pump housing 14, preferably includes engagement elements 310 peripherally distributed around the outer periphery of the stator housing 4. The engagement elements 310 (see FIG. 1, and in particular also FIGS. 3-7) have an essentially parallelepiped shape and are orientated in the radial direction to the rotor axis 22. Fitting with this, the pump housing 14 comprises engagement elements along its inner peripheral surface, in the form of recesses 312 which correspond to the engagement elements 310 of the stator housing 4, in a manner such that they may engage into one another as a bayonet closure. Thereby, the engagement elements 312 are designed as essentially L-shaped recesses (FIG. 1). Thereby, in each case a first limb 314 of the recesses 312 extends in the axial direction up to the axial end of the pump housing 14, the end facing the stator housing. The second limbs 315 of the L-shaped recesses 312 are in each case orientated perpendicularly along the inner peripheral surface to these first limbs and are arranged on the ends of the axially orientated recesses 314, the ends being away from the stator housing 4. These peripherally orientated limbs 315 are designed precisely so long, that the parallelepiped engagement elements of the stator housing 4 leave the axially orientated region of the recesses by way of rotation of the stator housing 4 about the rotor axis 22, and may engage with the peripherally orientated recesses 315. The closure of the stator housing 4 and the pump housing 14 is thus effected in a manner such that the stator housing 4 is inserted axially into the pump housing 14 and is rotated about the rotor axis 22, after the engagement elements 310 of the stator housing 4 abut on the axial ends of the engagement elements 312 of the pump housing 14. In this manner, the engagement elements 310 of the stator housing 4 axially engage behind the engagement elements 312 of the pump housing 14. The stator housing 4 and pump housing 14 are thus connected to one another with a positive fit. The sides of the radially orientated engagement elements 310, 315, which are close to the stator housing 4, are inclined in the direction of the stator housing 4 with an increasing radial distance to the rotor axis 22. For this reason, the engagement elements 310 of the stator housing 4 engage into the engagement elements 312 of the pump housing 14, similarly to barbs (FIGS. 4-6).

A tongue 318 is preferably elastically formed on the cylindrical peripheral surface of the pump housing 14, at the end of the pump housing 14, which faces the stator housing 4, in the peripheral wall, for the rotationally fixed locking of the stator housing 4 relative to the pump housing 14 (FIG. 7).

The tongue 318 thereby functions as a locking element which is designed for locking into a toothing of the stator housing 4. The free end of the tongue 318, for this, is bent slightly to the stator housing 4, so that it projects in the axial direction beyond the axial end of the pump housing 14. The toothing is located peripherally on a collar 319 which is arranged at that axial end of the stator housing 4, which faces the pump housing 14. The collar 319 projects in the radial direction beyond the peripheral wall of the stator housing 4, wherein, at its outer periphery, it terminates in an essentially flush manner with the outer periphery of the pump housing 14. The toothing is formed on the axial end-side of the collar 319, from a multitude of notches 320, and extends over the whole periphery of the collar 319. The notches 320 are arranged in a manner such that a notch 320 is located at the same peripheral position for each L-shaped recess 312. The notches 320 form the toothing in the form of a saw-tooth profile. This saw-tooth profile accordingly includes two flanks 321, 322 with a greatly different axial gradient. The tongue 318 firstly limits the rotation ability of the stator housing 4 to one rotation direction, via the different flank gradient.

Thereby, the tongue 318 and toothing cooperate similarly to the closure of a cable tie. Thereby, every second flank 321 is orientated almost parallel to the longitudinal axis of the tongue 318, i.e., at an acute angle to the peripheral direction with respect to the longitudinal axis 22 of the rotor 8, and the intermediately lying flanks 322 in contrast have almost axial alignments. For this reason, the tongue 318, when it lies on a flank 321 which is parallel to its longitudinal axis, may easily drag along this flank, when the axially orientated flank 322 which faces the tongue 318, is moved away from the free end of the tongue 318 by way of rotation of the stator housing 4. In this rotation direction, the tongue 318 is merely elastically deformed in the direction of the pump housing 14. After the axial flanks 322 of the toothing have passed the tongue 318, the tongue 318 may relax again and come to bear on the next flank 321 which is parallel to its longitudinal axis. For this reason, no type of positive-fit blocking at all occurs with this rotation direction. If however, the rotation direction is reversed, then the free end of the tongue 318 comes to bear on an adjacent axial flank 322 which faces the tongue 318, so that the rotation movement is blocked with a positive fit.

Thus the stator housing 4 is prevented from rotating in at least one direction. The stator housing 4, however, is likewise prevented from a rotation in one direction likewise with the abutment of the profiled engagement elements 310 onto the ends of the peripherally orientated limbs 315 of the L-shaped recesses 312. With this, the device has two limitations of the rotation directions. For the rotationally fixed locking of the stator housing 4, these are combined in a manner such that they limit a rotation in opposite directions, so that a rotation of the stator housing 4 is not possible in any direction. This is accomplished such that the free end of the tongue 318 points in the same direction as the peripherally orientated limbs 315 of the L-shaped recess 312. With this, the tongue 318 and the notches 320 cooperate as locking elements for the locking of the rotation angle of the stator housing 4.

The rotationally fixed locking of the stator housing 4 by way of the tongue 318 is furthermore releasable. For this purpose, a handle 323 is arranged at the tip of the tongue 318, by way of which handle the tongue 318 may be bent away from the stator housing 4 in the axial direction. Thus, the tongue 318 may disengage from the notches 320, so that a rotation of the stator housing 4 is possible for the release of the engagement elements 310, 312 from the pump housing 14 and stator housing 4.

The fluid-tightness of the connection of the stator housing 4 and pump housing 14 is accomplished by a sealing ring 416. The sealing ring 416 is arranged over the whole periphery around the rotation axis 22 and on the end-face 119 of the stator housing assembly 3, said end facing the pump housing. For this, a circular-cylindrical sealing flange 418, about which the sealing ring 416 is arranged in a circular manner, is located peripherally around the rotor axis 22, on the end-face 119. On the other hand, a peripherally oriented rotation surface 419, on which the sealing ring 416 may come to bear, is located on the inner peripheral surface of the pump housing 14. With this, the sealing ring 416 seals the pump housing 14 and the stator housing 4, by way of the sealing ring 416 bearing along its inner periphery on the sealing flange 418 of the stator housing 14, and with its outer periphery on the sealing surface 419. Furthermore, the sealing ring 416 also bears on a bearing carrier 420, in which the rotor 8 and the impeller 26 are arranged in a stable and rotatable manner. The bearing carrier 420 is designed essentially as a circular disk which is orientated perpendicularly to the rotor axis 22 and which includes a projection 421 in the form of an annulus peripherally surrounding the rotor axis 22, for fitting into the end-face 119 of the stator housing 4. Thereby, the sealing ring 416 lies in the axial direction between the bearing carrier 420 and the stator housing 4.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A stator housing assembly for a pump with a wet-running electric motor including a stator housing and a can coupled to an axial end of the stator housing facing a pump housing by an end-face of the stator housing, wherein the stator housing, the end-face, and the can are designed as a single-part component, wherein a rotor of the electric motor is disposed in the can and includes a rotor axis about which the rotor rotates, and wherein a bearing is supported by the can in an in-molded bearing holder and is arranged between a portion of the rotor and the can in a radial direction as measured from the rotor axis, wherein a through-hole extends through the can at an axial end of the can opposite to the pump housing, the through-hole having an in-molded thread and being closed by a screw that is removable to allow the rotor to be rotated via the through-hole, and wherein a cavity is formed between the stator housing and the can, in which cavity struts are arranged between the stator housing and the can to connect the stator housing and the can to one another.

2. The stator housing assembly according to claim 1, wherein the stator housing and the can are manufactured of plastic as an injection molded part.

3. The stator housing assembly according to claim 1, wherein the stator housing and the can are manufactured of a composite material containing polyphenylene sulphide.

4. The stator housing assembly according to claim 1, wherein the through-hole has an inner thread and extends coaxially with a longitudinal axis of the can.

5. The stator housing assembly according to claim 1, wherein the stator housing comprises at least one engagement element for a positive-fit connection to a pump housing.

6. A pump with a wet-running electric motor comprising the stator housing assembly according to claim 1.

7. The pump according to claim 6, wherein the pump housing and the stator housing are provided with engagement elements which correspond to one another and which are engaged with one another with a positive fit and connect the pump housing to the stator housing.

8. The pump according to claim 7, wherein the axial end-face which faces the pump housing has an essentially cylinder-envelope-shaped outer peripheral surface, and the pump housing comprises an end which faces the stator housing and with an essentially cylinder-envelope-shaped inner peripheral surface, and the engagement elements are orientated in the radial direction on these outer and inner peripheral surfaces.

9. The pump according to claim 8, wherein the engagement elements form a connection in the form of a bayonet closure.

10. The pump according to claim 8, wherein the radially orientated engagement elements comprise a surface piece on their side which is close to the stator housing, said surface piece being inclined in the direction of the stator housing with an increasing radial distance.

11. The pump according to claim 8, wherein a sealing ring is arranged between the stator housing and the pump housing peripherally around a sealing flange arranged on the stator housing.

12. The pump according to claim 7, wherein the pump is a heating circulation pump.

13. The pump according to claim 11, wherein the sealing flange extends axially toward the pump housing from the axial end-face which faces the pump housing.

* * * * *